United States Patent
Tsai et al.

(10) Patent No.: US 10,321,150 B2
(45) Date of Patent: Jun. 11, 2019

(54) MOTION VECTOR SELECTION AND PREDICTION IN VIDEO CODING SYSTEMS AND METHODS

(71) Applicant: REALNETWORKS, INC., Seattle, WA (US)

(72) Inventors: Chia-Yang Tsai, Seattle, WA (US); Kyle Kuang, Seattle, WA (US); Xiaobo Liu, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 15/562,783

(22) PCT Filed: Mar. 31, 2015

(86) PCT No.: PCT/CN2015/075599
§ 371 (c)(1),
(2) Date: Sep. 28, 2017

(87) PCT Pub. No.: WO2016/154930
PCT Pub. Date: Oct. 6, 2016

(65) Prior Publication Data
US 2018/0199053 A1     Jul. 12, 2018

(51) Int. Cl.
*H04N 19/46*     (2014.01)
*H04N 19/52*     (2014.01)
(Continued)

(52) U.S. Cl.
CPC ........... *H04N 19/52* (2014.11); *H04N 19/159* (2014.11); *H04N 19/176* (2014.11); *H04N 19/46* (2014.11)

(58) Field of Classification Search
None
See application file for complete search history.

(56) References Cited

U.S. PATENT DOCUMENTS

2005/0053300 A1*   3/2005   Mukerjee ............. H04N 19/105
                                                                                                                                         382/239
2008/0225955 A1   9/2008   Ridge et al.
(Continued)

FOREIGN PATENT DOCUMENTS

CN       1689026 A      10/2005
EP       0562420 A2      9/1993
(Continued)

OTHER PUBLICATIONS

Kim et al., "Non-CE9: reordering of merge candidate," JCTVC-G396, 7th Meeting of the Joint Collaborative Team on Video Coding (JCT-VC) of ITU-T SG16 WP3 and ISO/IEC JTC1/SC29/WG11, Geneva, Switzerland, Nov. 19-30, 2011, 15 pages.
(Continued)

*Primary Examiner* — Mohammed S Rahaman
(74) *Attorney, Agent, or Firm* — Seed IP Law Group LLP

(57) ABSTRACT

An unencoded video frame of a sequence of video frames is encoded to generate an encoded bit-stream representative of the unencoded video frame. The encoded bit-stream includes a header portion and a video data payload portion. The unencoded video frame may be divided into an array of prediction blocks, including a first prediction block. A coding mode is selected from a plurality of coding modes for use in encoding the first prediction block. The first prediction block is encoded using the selected coding mode to generate a portion of the video data payload of the encoded bit-stream. A coding mode selection flag is provided in the header portion of the encoded bit-stream, which indicates which coding mode of the plurality of coding modes was selected for encoding the first prediction block.

21 Claims, 8 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2012/0263231 A1* | 10/2012 | Zhou | H04N 19/52 375/240.12 |
| 2012/0320984 A1 | 12/2012 | Zhou | |
| 2014/0376638 A1 | 12/2014 | Nakamura et al. | |

FOREIGN PATENT DOCUMENTS

| | | |
|---|---|---|
| EP | 2 755 389 A2 | 7/2014 |
| JP | 2004-96705 A | 3/2004 |
| JP | 2013-236366 A | 11/2013 |
| WO | 2012/098776 A1 | 7/2012 |
| WO | 2012/173415 A2 | 12/2012 |
| WO | 2013/036071 A2 | 3/2013 |

OTHER PUBLICATIONS

Japanese Office Action, dated Apr. 17, 2019, for Japanese Application No. 2017-551080, 12 pages. (with English Machine Translation).

Joint Collaborative Team on Video Coding, "Test Model under Consideration," *Joint Collaborative Team on Video Coding (JCT-VC) of ITU-T SG16 WP3 and ISO/IEC JTC1/SC29/WG11, 2nd Meeting*, Geneva, Switzerland, Jul. 21-28, 2010. (45 pages).

Nakamura et al., "Default value for skip/merge and AMVP,"*AM Joint Collaborative Team on Video Coding (JCT-VC) of ITU-T SG 16 WP 3 and ISO/IEC JTC 1/SC 29/WG 11, 9th Meeting*, Geneva, Switzerland, Apr. 27-May 7, 2012. (17 pages).

Sugio et al., "On MVP candidate list for AMVP/Merge,"*AM Joint Collaborative Team on Video Coding (JCT-VC) of ITU-T SG 16 WP 3 and ISO/IEC JTC 1/SC 29/WG 11, 9th Meeting*, Geneva, Switzerland, Apr. 27-May 7, 2012. (7 pages).

\* cited by examiner

MOTION VECTOR SELECTION AND PREDICTION IN VIDEO CODING SYSTEMS AND METHODS

FIELD

This disclosure relates to encoding and decoding of video signals, and more particularly, to selecting predictive motion vectors for frames of a video sequence.

BACKGROUND

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/or TV display. Thus, efficient communication, storage or transmission of the large volume of digital multimedia content requires its compression from raw PCM form to a compressed representation. Thus, many techniques for compression of multimedia have been invented. Over the years, video compression techniques have grown very sophisticated to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression. In the standards-body-driven standards, this is evidenced by the recently started effort by ISO MPEG in High Efficiency Video coding which is expected to combine new technology contributions and technology from a number of years of exploratory work on H.265 video compression by ITU-T standards committee.

All aforementioned standards employ a general inter-frame predictive coding framework that involves reducing temporal redundancy by compensating for motion between frames of video. The basic concept is to remove the temporal dependencies between neighboring pictures by using block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures in display order, whereas B-type pictures may utilize information from both previous and future pictures in display order.

For P-type and B-type frames, each frame is then divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference between the reference block and the current block is calculated to generate a residual (also referred to as a "residual signal"). Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g. using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded.

On the decoder side, inversed quantization and inversed transforms are applied to recover the spatial residual signal. These are typical transform/quantization process in all video compression standards. A reverse prediction process may then be performed in order to generate a recreated version of the original unencoded video sequence.

In past standards, the blocks used in coding were generally sixteen by sixteen pixels (referred to as macroblocks in many video coding standards). However, since the development of these standards, frame sizes have grown larger and many devices have gained the capability to display higher than "high definition" (or "HD") frame sizes, such as 2048×1530 pixels. Thus it may be desirable to have larger blocks to efficiently encode the motion vectors for these frame size, e.g. 64×64 pixels. However, because of the corresponding increases in resolution, it also may be desirable to be able to perform motion prediction and transformation on a relatively small scale, e.g. 4×4 pixels.

As the resolution of motion prediction increases, the amount of bandwidth required to encode and transmit motion vectors increases, both per frame and accordingly across entire video sequences.

DETAILED DESCRIPTION

Figure 1:
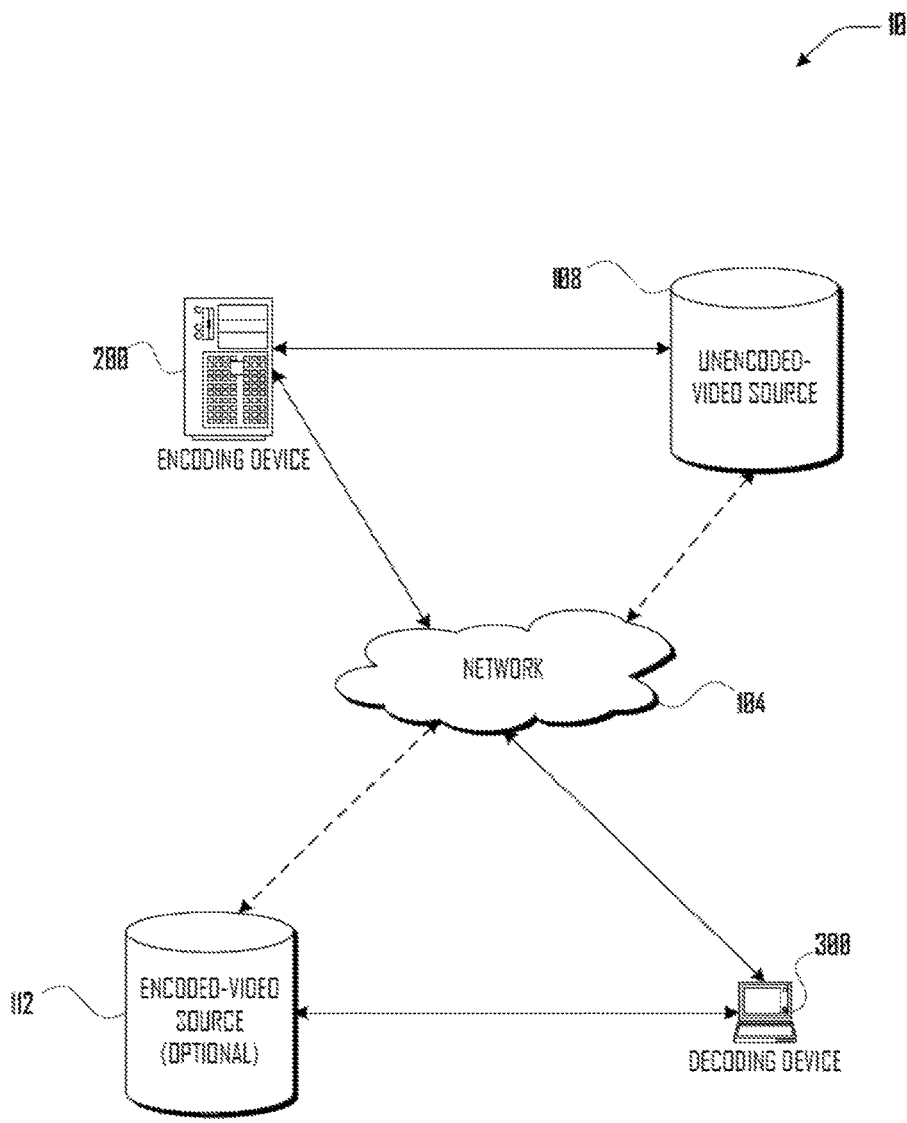
FIG. 1 illustrates an exemplary video encoding/decoding system according to at least one embodiment.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope to the embodiments disclosed herein.

Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Decoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, encoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200, may be a networked computing device generally capable of accepting requests over network 104, e.g. from decoding device 300, and providing responses accordingly. In various embodiments, decoding device 300 may be a networked computing device having a form factor such as a mobile-phone; watch, glass, or other wearable computing device; a dedicated media player; a computing tablet; a motor vehicle head unit; an audio-video on demand (AVOD) system; a dedicated media console; a gaming device, a "set-top box," a digital video recorder, a television, or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

Exemplary Encoding Device

Figure 2:
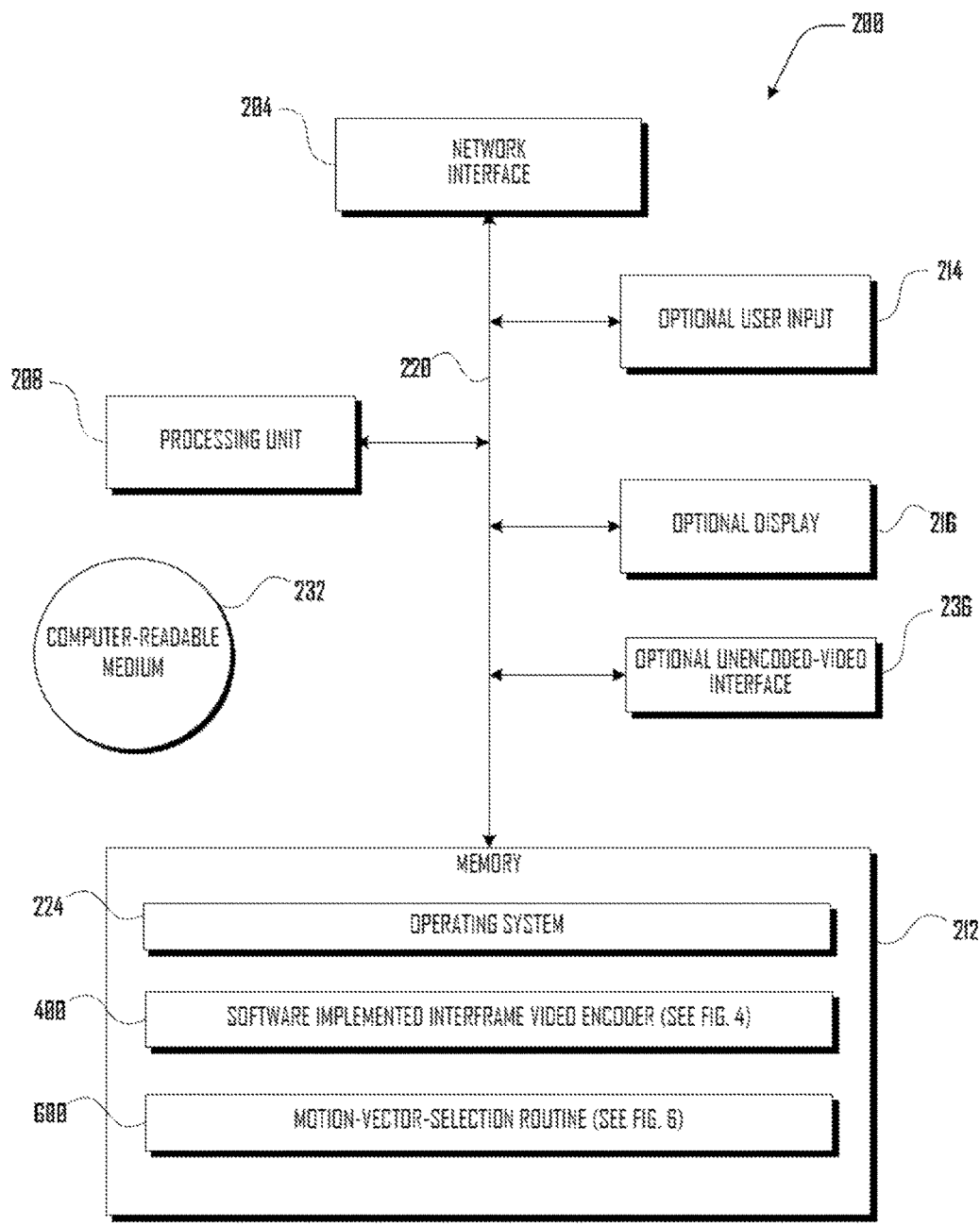
FIG. 2 illustrates several components of an exemplary encoding device, in accordance with at least one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208, a memory 212, an optional user input 214 (e.g. an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like.

The memory 212 of exemplary encoding device 200 stores an operating system 224 as well as program code for a number of software services, such as software implemented interframe video encoder 400 (described below in reference to FIG. 4) with instructions for performing a motion-vector-selection routine 600 (described below in reference to FIG. 6). Memory 212 may also store video data files (not shown) which may represent unencoded copies of audio/visual media works, such as, by way of examples, movies and/or television episodes. These and other software components may be loaded into memory 212 of encoding device 200 using a drive mechanism (not shown) associated with a non-transitory computer-readable medium 232, such as a floppy disc, tape, DVD/CD-ROM drive, memory card, or the like. Although an exemplary encoding device 200 has been described, an encoding device may be any of a great number of networked computing devices capable of communicating with network 120 and executing instructions for implementing video encoding software, such as exemplary software implemented video encoder 400, and motion-vector-selection routine 600.

In operation, the operating system 224 manages the hardware and other software resources of the encoding device 200 and provides common services for software applications, such as software implemented interframe video encoder 400. For hardware functions such as network communications via network interface 204, receiving data via input 214, outputting data via display 216, and allocation of memory 212 for various software applications, such as software implemented interframe video encoder 400, operating system 224 acts as an intermediary between software executing on the encoding device and the hardware.

In some embodiments, encoding device 200 may further comprise a specialized unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of encoding video, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

Exemplary Decoding Device

Figure 3:
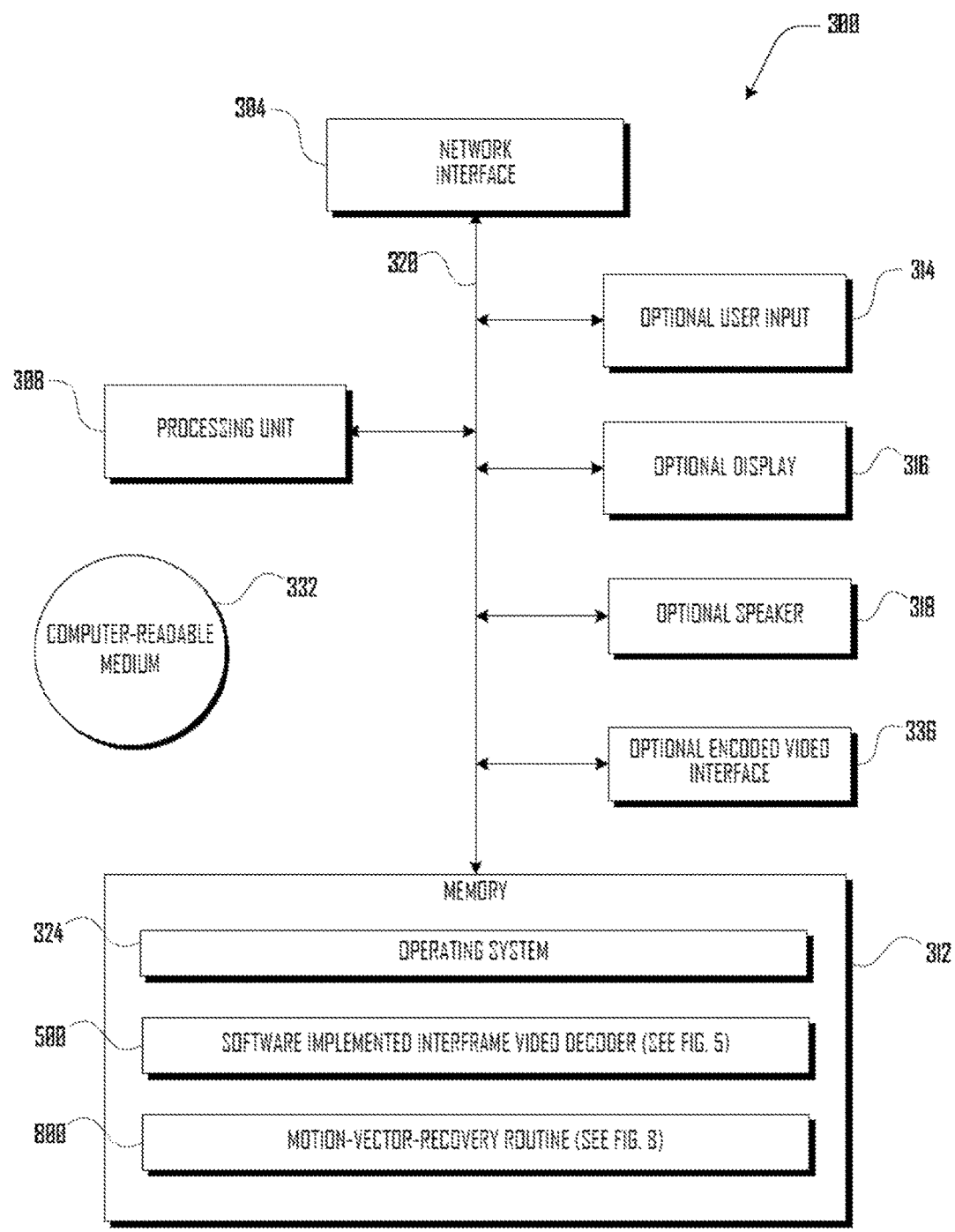
FIG. 3 illustrates several components of an exemplary decoding device, in accordance with at least one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308, a memory 312, an optional user input 314 (e.g. an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

The memory 312 of exemplary decoding device 300 may store an operating system 324 as well as program code for a number of software services, such as software implemented video decoder 500 (described below in reference to FIG. 5) with instructions for performing motion-vector recovery routine 800 (described below in reference to FIG. 8). Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like. Although an exemplary decoding device 300 has been described, a decoding device may be any of a great number of networked computing devices capable of communicating with a network, such as network 120, and executing instructions for implementing video decoding software, such as exemplary software implemented video decoder 500, and accompanying message extraction routine 700.

In operation, the operating system 324 manages the hardware and other software resources of the decoding device 300 and provides common services for software applications, such as software implemented video decoder 500. For hardware functions such as network communications via network interface 304, receiving data via input 314, outputting data via display 316 and/or optional speaker 318, and allocation of memory 312, operating system 324 acts as an intermediary between software executing on the encoding device and the hardware.

In some embodiments, decoding device 300 may further comprise a optional encoded video interface 336, e.g. for communicating with encoded-video source 116, such as a high speed serial bus, or the like. In some embodiments, decoding device 300 may communicate with an encoded-video source, such as encoded video source 116, via network interface 304. In other embodiments, encoded-video source 116 may reside in memory 312 or computer readable medium 332.

Although an exemplary decoding device 300 has been described that generally conforms to conventional general purpose computing devices, an decoding device 300 may be any of a great number of devices capable of decoding video, for example, a video recording device, a video co-processor and/or accelerator, a personal computer, a game console, a set-top box, a handheld or wearable computing device, a smart phone, or any other suitable device.

Decoding device 300 may, by way of example, be operated in furtherance of the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

Software Implemented Interframe Video Encoder

Figure 4:
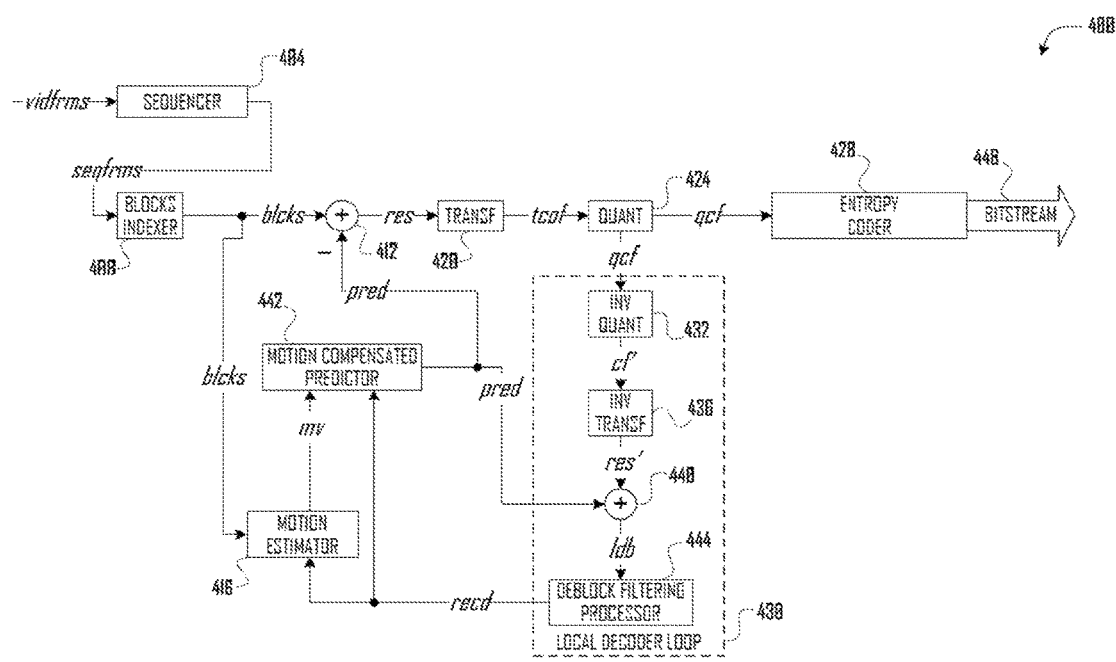
FIG. 4 illustrates a block diagram of an exemplary video encoder in accordance with at least one embodiment.

FIG. 4 shows a general functional block diagram of software implemented interframe video encoder 400 (hereafter "encoder 400") employing enhanced motion vector selection and prediction techniques in accordance with at least one embodiment. One or more unencoded video frames (vidfrms) of a video sequence in display order may be provided to sequencer 404.

Sequencer 404 may assign a predictive-coding picture-type (e.g. I, P, or B) to each unencoded video frame and reorder the sequence of frames, or groups of frames from the sequence of frames, into a coding order (e.g. I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g. sixty-four by sixty-four pixels) and divide the unencoded frame into an array of coding blocks (cblks). Individual coding blocks within a given frame may vary in size, e.g. from four by four pixels up to the LCB size for the current frame.

Each coding block may then be input one at a time to differencer 412 and may be differenced with corresponding prediction signal blocks (pred) generated from previously encoded coding blocks. Coding blocks (cblks) may also be provided to motion estimator 416 (discussed below). After differencing at differencer 412, a resulting residual signal (res) may be forward-transformed to a frequency-domain representation by transformer 420, resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

At the beginning of local decoding loop 430, inverse quantizer 432 may de-quantize the block of transform coefficients (tcof') and pass them to inverse transformer 436 to generate a de-quantized residual block (res'). At adder 440, a prediction block (pred) from motion compensated predictor 442 may be added to the de-quantized residual block (res') to generate a locally decoded block (rec). Locally decoded block (rec) may then be sent to a frame assembler and deblock filter processor 444, which reduces blockiness and assembles a recovered frame (recd), which may be used as the reference frame for motion estimator 416 and motion compensated predictor 442.

Entropy coder 428 encodes the quantized transform coefficients (qcf), differential motion vectors (dmv), and other data, generating an encoded video bit-stream 448. For each frame of the unencoded video sequence, encoded video bit-stream 448 may include encoded picture data (e.g. the encoded quantized transform coefficients (qcf) and differential motion vectors (dmv)) and an encoded frame header (e.g. syntax information such as the LCB size for the current frame).

Referring to the functionality of motion estimator 416, and as is explained in more detail below in reference to FIGS. 6 and 7, in accordance with at least one embodiment, each coding block in an P-type or B-type frame can be intra-coded, i.e. a residual for the current coding block may be generated based on a previously encoded block ("reference block") from the same frame (as is the case for all coding blocks of an I-type frame), or inter-coded, i.e. a residual for the current coding block may be generated based one or more reference blocks from one or more previously encoded frames ("reference frame(s)"). In the illustrated embodiment, intra-coded coding blocks may be processed in any appropriate manner.

In accordance with at least one embodiment, for an inter-coded coding block, motion estimator 416 may select one of at least three coding modes to determine a motion vector (or motion vectors for a B-type frame) for the coding block: a skip-coding mode, a direct-coding mode, and an inter-coding mode.

Inter-Coding Mode

For coding blocks being coded in the inter-coding mode, motion estimator 416 may divide each coding block into one or more prediction blocks, e.g. having sizes such as 4×4 pixels, 8×8 pixels, 16×16 pixels, 32×32 pixels, or 64×64 pixels. For example, a 64×64 coding block may be divided into sixteen 16×16 prediction blocks, four 32×32 prediction blocks, or two 32×32 prediction blocks and eight 16×16 prediction blocks. Motion estimator 416 may then calculate a motion vector ($MV_{calc}$) for each prediction block by identifying an appropriate reference block and determining the relative spatial displacement from the prediction block to the reference block.

In accordance with an aspect of at least one embodiment, in order to increase coding efficiency, the calculated motion vector ($MV_{calc}$) may be coded by subtracting a motion vector predictor ($MV_{pred}$) from the calculated motion vector ($MV_{calc}$) to obtain a motion vector differential ($\Delta MV$). For example, if the calculated motion vector ($MV_{calc}$) is (5, −1) (i.e. a reference block from a previously encoded frame located five columns right and one row up relative to the current prediction block in the current frame) and the motion vector predictor is (5, 0) (i.e. a reference block from a previously encoded frame located five columns right and in the same row relative to the current prediction block in the current frame), the motion vector differential ($\Delta MV$) will be:

$$MV_{calc} - MV_{pred} = (5,-1) - (5,0) = (0,-1) = \Delta MV.$$

The closer the motion vector predictor (MVpred) is to the calculated motion vector (MVcalc), the smaller the value of the motion vector differential ($\Delta MV$). Therefore, accurate motion vector prediction which is independent of the content of the current prediction block, making it repeatable on the decoder side, may lead to significantly less information being needed to encode motion vector differentials than the calculated motion vectors over the course of an entire video sequence.

In accordance with an aspect of at least one embodiment, motion estimator 416 may use multiple techniques to obtain a motion vector predictor ($MV_{pred}$). For example, the motion vector predictor may be obtained by calculating the median value of several previously encoded motion vectors for prediction blocks of the current frame. For example, the motion vector predictor may be the median value of multiple previously coded reference blocks in the spatial vicinity of the current prediction block, such as: the motion vector for the reference block ($RB_a$) in the same column and one row above the current block; the motion vector for the reference block ($RB_b$) one column right and one row above the current prediction block; and the motion vector for the reference block ($RB_c$) one column to the left and in the same row as the current block.

As noted above, and in accordance with an aspect of at least one embodiment, motion estimator 416 may use additional or alternative techniques to provide a motion vector predictor for a prediction block in inter-coding mode. For example, another technique for providing a motion vector predictor may be to determine the mean value of multiple previously coded reference blocks in the spatial vicinity of the current prediction block, such as: the motion vector for the reference block ($RB_a$) in the same column and one row above the current block; the motion vector for the reference block ($RB_b$) one column right and one row above the current prediction block; and the motion vector for the reference block ($RB_c$) one column to the left and in the same row as the current block.

In accordance with an aspect of at least one embodiment, in order to increase coding efficiency, the encoder 400 may indicate which of the available techniques was used in the encoding of the current prediction block by setting an selected-motion-vector-prediction-method (SMV-PM) flag in the picture header for the current frame (or the prediction block header of the current prediction block). For example, in at least one embodiment the SMV-PM flag may be a one bit in length having two possible values, wherein one possible value indicates the motion vector predictor was obtained using the median technique described above and the second possible value indicates the motion vector predictor was obtained using an alternative technique.

In coding blocks encoded in the inter-coding mode, both the motion vector and the residual may be encoded into the bit-stream.

Skip-Coding and Direct-Coding Modes

For coding blocks being coded in the skip-coding or direct-coding modes, motion estimator 416 may use the entire coding block as the corresponding prediction block (PB).

In accordance with an aspect of at least one embodiment, in the skip-coding and direct-coding modes, rather than determine a calculated motion vector ($MV_{calc}$) for a prediction block (PB), motion estimator 416 may use a predefined method, described below in reference to FIG. 7, to generate an ordered list of motion vector candidates. For example, for a current prediction block ($PB_{cur}$), the ordered list of motion vector candidates may be made up of motion vectors previously used for coding other blocks of the current frame, referred to as "reference blocks" (RBs).

In accordance with an aspect of at least one embodiment, motion estimator 416 may then select the best motion vector candidate (MVC) from the ordered list for encoding the current prediction block ($PB_{cur}$). If process for generating the ordered list of motion vector candidates is repeatable on the decoder side only the index of the selected motion vector ($MV_{sel}$) within the ordered list of motion vector candidates may be included in encoded bit-stream rather than a motion vector itself. Over the course of an entire video sequence significantly less information may be needed to encode the index values than actual motion vectors.

In accordance with an aspect of at least one embodiment, the motion vectors selected to populate the motion vector candidate list are preferably taken from three reference blocks ($RB_a$, $RB_b$, $RB_c$) that have known motion vectors and share a border the current prediction block ($PB_{cur}$) and/or another reference block (RB). For example, the first reference block ($RB_a$) may be located directly above the current prediction block ($PB_{cur}$), the second reference block ($RB_b$) may be located directly to the right of the first reference block ($RB_a$), and the third reference block ($RB_c$) may be located to the left of the current prediction block ($RB_c$). However, the specific locations of the reference blocks relative to the current prediction block may not be important, so long as they are pre-defined so a downstream decoder may know where they are.

In accordance with an aspect of at least one embodiment, if all three reference blocks have known motion vectors, the first motion vector candidate ($MVC_1$) in the motion vector candidate list for the current prediction block ($PB_{cur}$) may be the motion vector ($MV_a$) (or motion vectors, in a B-type frame) from the first reference block ($RB_a$), the second motion vector candidate ($MVC_2$) may be the motion vector ($MV_b$) (or motion vectors) from the second reference block ($RB_b$), and the third motion vector candidate ($MVC_3$) may be the motion vector ($MV_c$) (or motion vectors) from the third reference block ($RB_c$). The motion vector candidate list may therefore be: (MVa, MVb, MVc).

However, if any of the reference blocks (RBs) do not have available motion vectors, e.g. because no prediction information is available for a given reference block or the current prediction block ($PB_{cur}$) is in the top row, leftmost column, or rightmost column of the current frame, that motion vector candidate may be skipped and the next motion vector candidate may take its place, and zero value motion vectors (0,0) may be substituted for the remaining candidate levels. For example, if no motion vector is available for $RB_b$, the motion vector candidate list may be: (MVa, MVc, (0,0)).

The full set of combinations for a motion vector candidate list given various combinations of motion vector candidate availability, in accordance with at least one embodiment, is shown in Table 1:

TABLE 1

| $RB_a$ | $RB_b$ | $RB_c$ | $MVC_1$ | $MVC_2$ | $MVC_3$ |
| --- | --- | --- | --- | --- | --- |
| n/a | n/a | n/a | (0,0) | (0,0) | (0,0) |
| n/a | n/a | $MV_c$ | $MV_c$ | (0,0) | (0,0) |
| n/a | $MV_b$ | N/A | $MV_b$ | (0,0) | (0,0) |
| n/a | $MV_b$ | $MV_c$ | $MV_b$ | $MV_c$ | (0,0) |
| $MV_a$ | n/a | n/a | $MV_a$ | (0,0) | (0,0) |
| $MV_a$ | n/a | $MV_c$ | $MV_a$ | $MV_c$ | (0,0) |
| $MV_a$ | $MV_b$ | n/a | $MV_a$ | $MV_b$ | (0,0) |
| $MV_a$ | $MV_b$ | $MV_c$ | $MV_a$ | $MV_b$ | $MV_c$ |

Motion estimator 416 may then evaluate the motion vector candidates and select the best motion vector candidate to be used as the selected motion vector for the current prediction block. Note that as long as a downstream decoder knows how to populate the ordered list of motion vector candidates for a given prediction block, this calculation can be repeated on the decoder side with no knowledge of the contents of the current prediction block. Therefore, only the index of the selected motion vector from the motion vector candidate list needs to be included in encoded bit-stream rather than a motion vector itself, for example by setting a motion-vector-selection flag in the prediction block header of the current prediction block, and thus, over the course of an entire video sequence, significantly less information will be needed to encode the index values than actual motion vectors.

In the direct-coding mode, the motion-vector-selection flag and the residual between the current prediction block and the block of the reference frame indicated by the motion vector are encoded. In the skip-coding mode, the motion-vector-selection flag is encoded but the encoding of the residual signal is skipped. In essence, this tells a downstream decoder to use the block of the reference frame indicated by the motion vector in place of the current prediction block of the current frame.

Software Implemented Interframe Decoder

Figure 5:
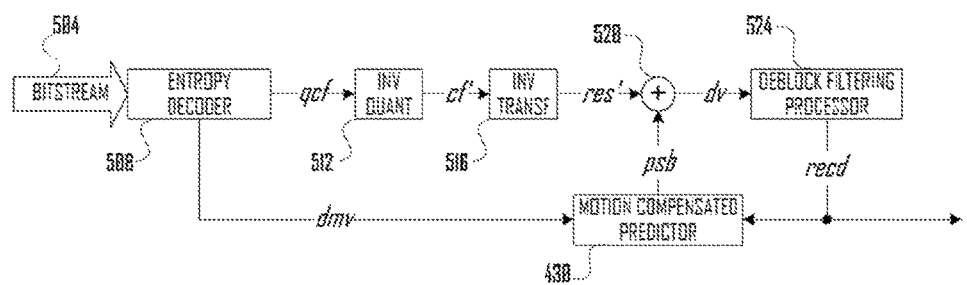
FIG. 5 illustrates a block diagram of an exemplary video decoder in accordance with at least one embodiment.

FIG. 5 shows a general functional block diagram of a corresponding software implemented interframe video decoder 500 (hereafter "decoder 500") employing enhanced motion compensated prediction techniques in accordance with at least one embodiment and being suitable for use with a decoding device, such as decoding device 300. Decoder 500 may work similarly to the local decoding loop 455 at encoder 400.

Specifically, an encoded video bit-stream 504 to be decoded may be provided to an entropy decoder 508, which may decode blocks of quantized coefficients (qcf), differential motion vectors (dmv), accompanying message data packets (msg-data) and other data. The quantized coefficient blocks (qcf) may then be inverse quantized by an inverse quantizer 512, resulting in de-quantized coefficients (tcof'). De-quantized coefficients (tcof') may then be inverse transformed out of the frequency-domain by an inverse transformer 516, resulting in decoded residual blocks (res'). An adder 520 may add motion compensated prediction blocks (pred) obtained by using corresponding motion vectors (mv). The resulting decoded video (dv) may be deblock-filtered in a frame assembler and deblock filtering processor 524. Blocks (recd) at the output of frame assembler and deblock filtering processor 528 form a reconstructed frame of the video sequence, which may be output from the decoder 500 and also may be used as the reference frame for a motion-compensated predictor 532 for decoding subsequent coding blocks.

Motion Vector Selection Routine

Figure 6:
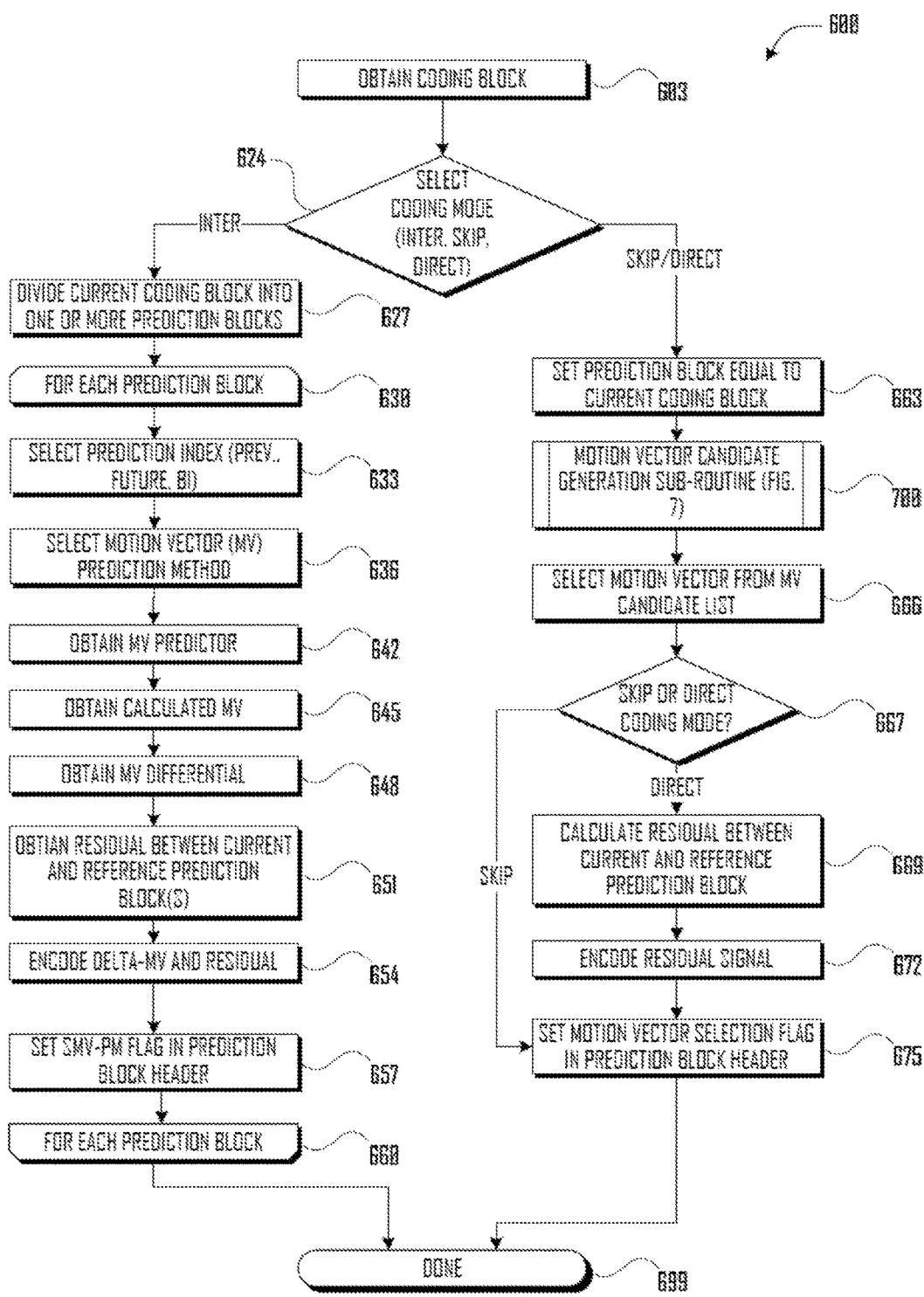
FIG. 6 illustrates an exemplary motion-vector-selection routine in accordance with at least one embodiment.

FIG. 6 illustrates a motion-vector-selection routine 600 suitable for use with at least one embodiment, such as encoder 400. As will be recognized by those having ordinary skill in the art, not all events in the encoding process are illustrated in FIG. 6. Rather, for clarity, only those steps reasonably relevant to describing the motion-vector-selection routine are shown.

At execution block 603, a coding block is obtained, e.g. by motion estimator 416.

At decision block 624, motion-vector-selection routine 600 selects a coding mode for the coding block. For example, as is described above, an inter-coding mode, a direct-coding mode, or a skip-coding mode may be selected. If either the skip-coding or the direct-coding modes are selected for the current coding block, motion-vector-selection routine 600 may proceed to execution block 663, described below.

If, at decision block 624, the inter-coding mode is selected for the current coding block, then at execution block 627 motion-vector-selection routine 600 may divide the current coding block into one or more prediction blocks and, beginning at starting loop block 630, each prediction block of the current coding block may be addressed in turn.

At execution block 633, motion-vector-selection routine 600 may select a prediction index for the current prediction block, indicating whether the reference frame is a previous picture, a future picture, or both, in the case of a B-type picture.

At execution block 636, motion-vector-selection routine 600 may then select a motion-vector prediction method, such as the median or mean techniques described above or any available alternative motion-vector prediction method.

At execution block 642, motion-vector-selection routine 600 may obtain a motion vector predictor ($MV_{pred}$) for the current prediction block using the selected motion vector prediction method.

At execution block 645, motion-vector-selection routine 600 may obtain a calculated motion vector ($MV_{calc}$) for the current prediction block.

At execution block 648, motion-vector-selection routine 600 may obtain a motion vector differential ($\Delta MV$) for the current prediction block (note for P-type pictures there may be a single motion vector differential and for B-type pictures there may be two motion vector differentials).

At execution block 651, motion-vector-selection routine 600 may obtain a residual between the current prediction block ($PB_{cur}$) relative to the block indicated by the calculated motion vector ($MV_{calc}$).

At execution block 654, motion-vector-selection routine 600 may encode the motion vector differential(s) and the residual for the current prediction block.

At execution block 657, motion-vector-selection routine 600 may set an SMV-PM flag in the picture header for the current frame (or the prediction block header for the current prediction block) indicating which motion vector prediction technique was used for the current prediction block.

At ending loop block 660, motion-vector-selection routine 600 returns to starting loop block 630 to process the next prediction block (if any) of the current coding block.

Returning to decision block 624, if either the skip-coding or direct-coding modes is selected for the current coding block, then at execution block 663 motion-vector-selection routine 600 sets the current prediction block to equal the current coding block.

Motion-vector-selection routine 600 may then call motion-vector-candidate-generation sub-routine 700 (described below in reference to FIG. 7), which may return an ordered list of motion vector candidates to motion-vector-selection routine 600.

At execution block 666, motion-vector-selection routine 600 may then select a motion vector from the motion vector candidate list for use in coding the current prediction block.

At decision block 667, if the selected coding mode is direct-coding, then at execution block 669 motion-vector-selection routine 600 calculates a residual between the current prediction block and the reference block indicated by the selected motion vector.

At execution block 672, motion-vector-selection routine 600 may encode the residual and at execution block 675 motion-vector-selection routine 600 may set a motion-vector-selection flag in the current prediction block's prediction block header indicating which of the motion vector candidates was selected for use in coding the current prediction block.

Motion-vector-selection routine 600 ends at termination block 699.

Motion-Vector-Candidate-Generation Sub-Routine 700

Figure 7:
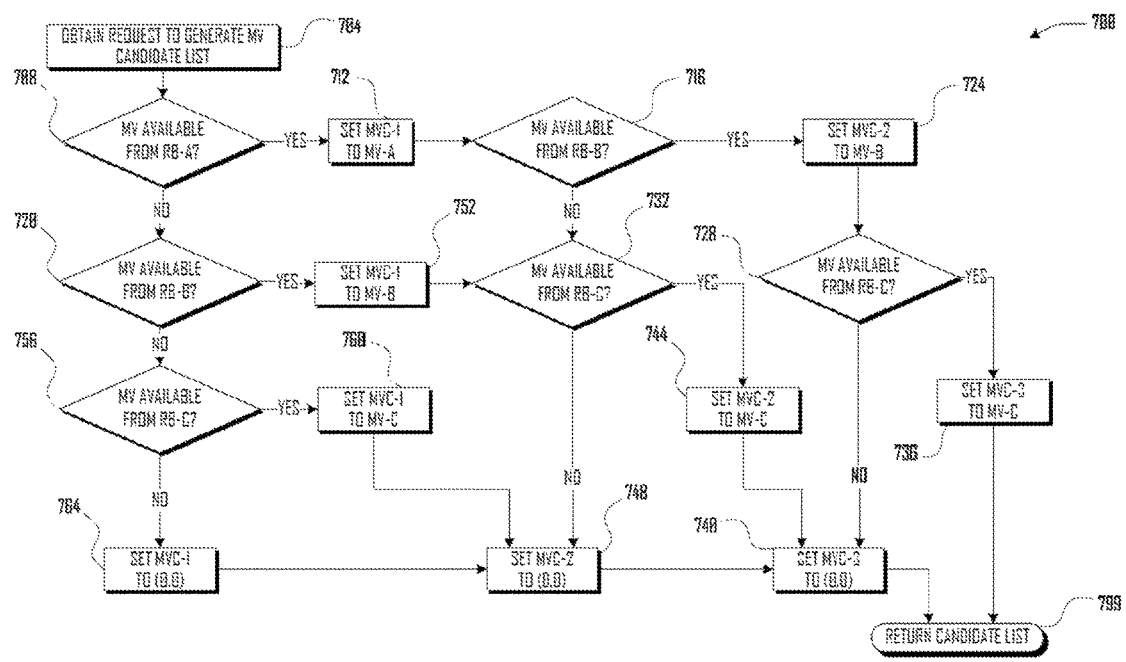
FIG. 7 illustrates an exemplary motion-vector-candidate-generation sub-routine in accordance with at least one embodiment.

FIG. 7 depicts motion-vector-candidate-generation sub-routine 700 for generating an ordered list of motion vector candidates in accordance with at least one embodiment. In the illustrated embodiment, three motion vector candidates are generated. However, those having ordinary skill in the art will recognize that greater or fewer amounts of candidates may be generated using the same technique, and further that alternate and/or equivalent implementations may be substituted for the specific embodiments shown and described without departing from the scope of the present disclosure.

Motion-vector-candidate generation sub-routine 700 obtains a request to generate a motion-vector-candidate list for the current prediction block at execution block 704.

At decision block 708, if a motion vector is available from the first candidate reference block ($RB_a$), then at execution block 712, motion-vector-candidate generation sub-routine 700 may set the first motion vector candidate ($MVC_1$) to $MV_a$ and proceed to decision block 716.

At decision block 716, if a motion vector is available from the second candidate reference block ($RB_b$), then at execution block 724, motion-vector-candidate generation sub-routine 700 may set the second motion vector candidate ($MVC_2$) to $MV_b$ and proceed to decision block 728.

At decision block 728, if a motion vector is available from the third candidate block ($RB_c$), then at execution block 736, motion-vector-candidate generation sub-routine 700 may set the third motion vector candidate ($MVC_3$) to MVc.

Motion-vector-candidate generation sub-routine 700 may then return a motion vector candidate list having respective values of $MVC_1=MV_a$, $MVC_2=MV_b$, and $MVC_3=MV_c$ at return block 799.

Referring again to decision block 728, if no motion vector is available from the third candidate block ($RB_c$), then at execution block 740 motion-vector-candidate generation sub-routine 700 may set the third motion vector candidate ($MVC_3$) to (0,0).

Motion-vector-candidate generation sub-routine 700 may then return a motion vector candidate list having respective values of $MVC_1=MV_a$, $MVC_2=MV_b$, and $MVC_3=(0,0)$ at return block 799.

Referring again to decision block 716, if no motion vector is available from the second candidate block ($RB_b$), then motion-vector-candidate generation sub-routine 700 may proceed to decision block 732.

At decision block 732, if a motion vector is available from the third candidate reference block ($RB_c$), then at execution block 744 motion-vector-candidate-generation sub-routine 700 may set the second motion vector candidate ($MVC_2$) to MVc. The third motion vector candidate ($MVC_3$) may then be set to (0,0) at execution block 740.

Motion-vector-candidate generation sub-routine 700 may then return a motion vector candidate list having respective values of $MVC_1=MV_a$, $MVC_2=MV_c$, and $MVC_3=(0,0)$ at return block 799.

Referring again to decision block 732, if no motion vector is available from the third candidate reference block ($RB_c$), then at execution block 748, motion-vector-candidate-generation sub-routine 700 may set the second motion vector candidate ($MVC_2$) to (0,0) and may set the third motion vector candidate ($MVC_3$) to (0,0) at execution block 740.

Motion-vector-candidate generation sub-routine 700 may then return a motion vector candidate list having respective values of $MVC_1=MV_a$, $MVC_2=(0,0)$, and $MVC_3=(0,0)$ at return block 799.

Referring again to decision block 708, if no motion vector is available from the first candidate reference block ($RB_a$), motion-vector-candidate generation sub-routine 700 may proceed to decision block 720.

At decision block 720, if a motion vector is available from the second candidate reference block ($RB_b$), then at execution block 752 motion-vector-candidate-generation sub-routine 700 may set the first motion vector candidate ($MVC_1$) to $MV_b$. Motion-vector-candidate-generation sub-routine 700 may then proceed to decision block 732.

Returning again to decision block 732, if a motion vector is available from the third candidate reference block ($RB_c$), then at execution block 744 motion-vector-candidate-generation sub-routine 700 may set the second motion vector candidate ($MVC_2$) to MVc. The third motion vector candidate ($MVC_3$) may then be set to (0,0) at execution block 740.

Motion-vector-candidate generation sub-routine 700 may then return a motion vector candidate list having respective values of $MVC_1=MV_b$, $MVC_2=MV_c$, and $MVC_3=(0,0)$ at return block 799.

Referring again to decision block 732, if no motion vector is available from the third candidate reference block ($RB_c$), then at execution block 748 motion-vector-candidate-generation sub-routine 700 may set the second motion vector candidate ($MVC_2$) to (0,0) and may set the third motion vector candidate ($MVC_3$) to (0,0) at execution block 740.

Motion-vector-candidate generation sub-routine 700 may then return a motion vector candidate list having respective values of $MVC_1=MV_b$, $MVC_2=(0,0)$, and $MVC_3=(0,0)$ at return block 799.

Referring again to decision block 720, if no motion vector is available from the second candidate reference block ($RB_b$), then motion-vector-candidate generation sub-routine 700 may proceed to decision block 756.

At decision block 756, if a motion vector is available from the third candidate reference block ($RB_c$), then at execution block 760 motion-vector-candidate generation sub-routine 700 may set the first motion vector candidate ($MVC_1$) to MVc. Motion-vector-candidate generation sub-routine 700 may then set the second motion vector candidate ($MVC_2$) to (0,0) at execution block 748 and the third motion vector candidate ($MVC_3$) to (0,0) at execution block 740.

Motion-vector-candidate generation sub-routine 700 may then return a motion vector candidate list having respective values of $MVC_1=MV_c$, $MVC_2=(0,0)$, and $MVC_3=(0,0)$ at return block 799.

Referring again to decision block 756, if no motion vector is available from the third candidate reference block ($RB_c$), then at execution block 764, motion-vector-candidate generation sub-routine 700 may set the first motion vector candidate ($MVC_1$) to (0,0). Motion-vector-candidate generation sub-routine 700 may then set the second motion vector candidate to (0,0) at execution block 748, and may set the third motion vector candidate to (0,0) at execution block 740.

Motion-vector-candidate generation sub-routine 700 may then return a motion vector candidate list having respective values of $MVC_1=MV_b$, $MVC_2=(0,0)$, and $MVC_3=(0,0)$ at return block 799.

Motion-Vector-Recovery Routine 800

Figure 8:
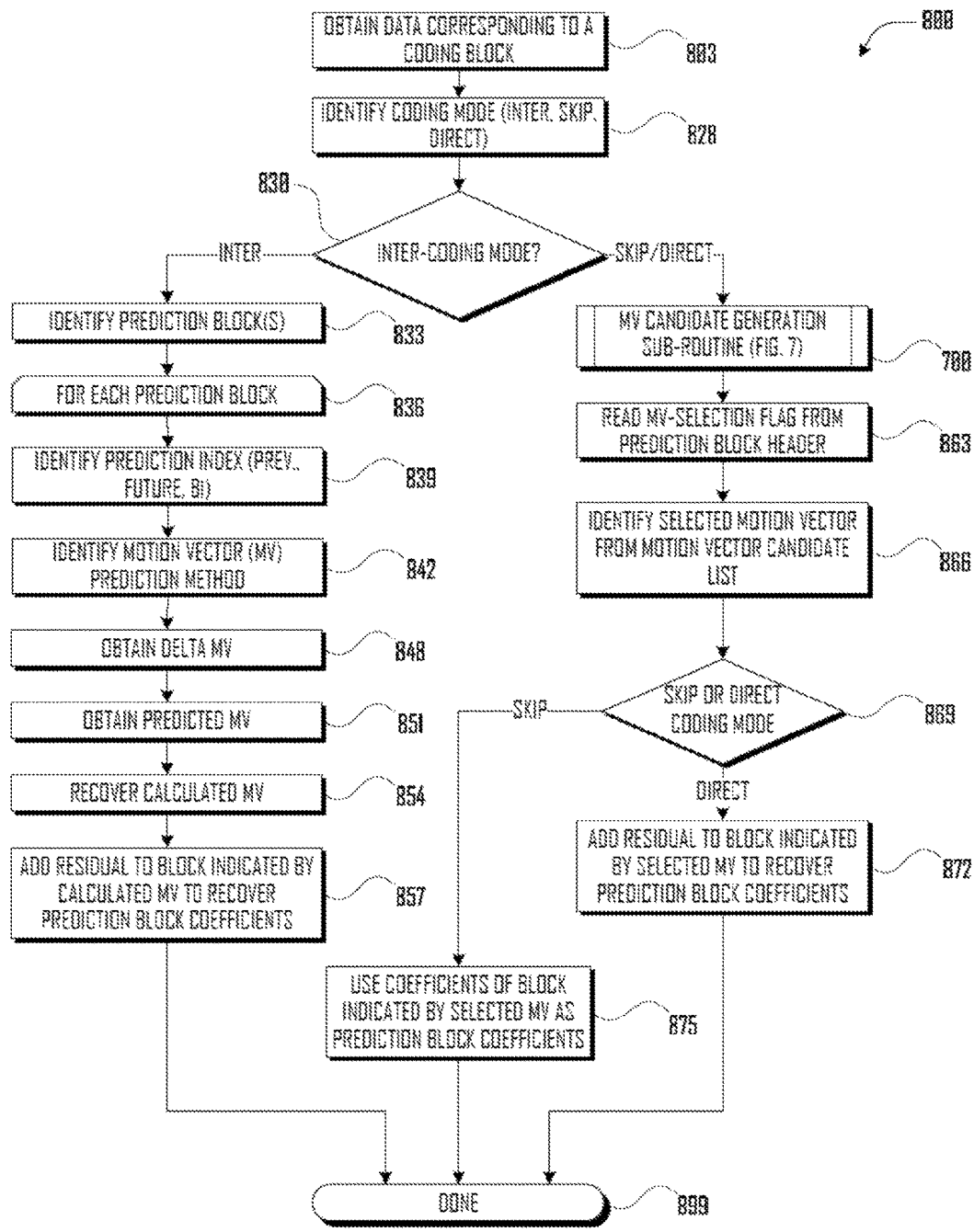
FIG. 8 illustrates an exemplary motion-vector-recovery routine in accordance with at least one embodiment.

FIG. 8 illustrates a motion-vector-recovery routine 800 suitable for use with at least one embodiment, such as decoder 500. As will be recognized by those having ordinary skill in the art, not all events in the decoding process are illustrated in FIG. 8. Rather, for clarity, only those steps reasonably relevant to describing the motion vector selection routine are shown.

At execution block 803, motion-vector-recovery routine 800 may obtain data corresponding to a coding block.

At execution block 828, motion-vector-recovery-routine 800 may identify the coding mode used to encode the coding block. As is described above, the possible coding modes may be an inter-coding mode, a direct-coding mode, or a skip-coding mode.

At decision block 830, if the coding block was encoded using the inter-coding mode, then at execution block 833 motion-vector-recovery routine 800 may identify the corresponding prediction block(s) for the coding block. At beginning loop block 836, each prediction block of the current coding block may be addressed in turn.

At execution block 839, motion-vector-recovery routine 800 may identify the prediction index for the current prediction block from the prediction block header.

At execution block 842, motion-vector-recovery routine 800 may identify the motion vector prediction method used for predicting the motion vector for the current prediction block, for example by reading an SMV-PM flag in the picture header for the current frame.

At execution block 848, motion-vector-recovery routine 800 may obtain a motion-vector differential (ΔMV) for the current prediction block.

At execution block 851, motion-vector-recovery routine 800 may obtain a predicted motion vector ($MV_{pred}$) for the current prediction block using the motion vector prediction method identified in execution block 842.

At execution block 854, motion-vector-recovery routine 800 may recover the calculated motion vector ($MV_{calc}$) for the current prediction block (note for P-type pictures there may be a single recovered motion vector and for B-type pictures there may be two recovered motion vectors), for example by adding the predicted motion vector ($MV_{pred}$) to the motion vector differential ($\Delta MV$).

At execution block 857, motion-vector-recovery routine 800 may then add the residual for the current prediction block to the block indicated by the calculated motion vector ($MV_{calc}$) to obtain recovered values for the prediction block.

Referring again to decision block 830, if the current coding block was encoded using either the skip-coding or direct-coding modes, then motion-vector-recovery routine 800 may then call motion-vector-candidate-generation subroutine 700 (described above in reference to FIG. 7), which may return an ordered list of motion vector candidates to motion-vector-recovery routine 800.

At execution block 863 motion-vector-recovery routine 800 may then read the motion-vector-selection flag from the prediction block header at execution block 863.

At execution block 866, motion-vector-recovery routine 800 may then use the motion-vector-selection flag to identify the motion vector from the ordered list of motion vector candidates list that was used to encode the current prediction block.

At decision block 869, if the current coding block was encoded in the direct-coding mode, at execution block 872 motion-vector-recovery routine 800 may add the residual for the prediction block to the coefficients of the block identified by the selected motion vector to recover the prediction block coefficients.

If the current coding block was encoded in the skip-coding mode, then at execution block 875, motion-vector-recovery routine 800 may use the coefficients of the reference block indicated by the selected motion vector as the coefficients for the prediction block.

Motion-vector-recovery routine 800 ends at termination block 899.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A method of encoding an unencoded video frame of a sequence of video frames to generate an encoded bit-stream representative of the unencoded video frame, the method comprising:
   obtaining a coding block from the unencoded video frame;
   selecting a coding mode from a plurality of coding modes for use in encoding the coding block, the plurality of coding modes include an inter-coding mode, a skip-coding mode, and a direct-coding mode;
   in response to selection of the inter-coding mode:
      dividing the obtained coding block into a plurality of prediction blocks; and
      for each respective prediction block of the plurality of prediction blocks:
         selecting a motion-vector-prediction method from a plurality of motion-vector-prediction methods for use in encoding the respective prediction block;
         encoding the respective prediction block based on the selected motion-vector-prediction method to generate a video data payload portion of the encoded bit-stream for the respective prediction block; and
         providing a selected-motion-vector-prediction-method flag in a header portion of the respective encoded prediction block, wherein the selected-motion-vector-prediction-method flag indicates which of the plurality of motion-vector-prediction methods was selected for encoding the respective prediction block;
   in response to selection of the skip-coding mode or the direct-coding mode:
      setting the obtained coding block as a current prediction block;
      obtaining an ordered list of motion-vector candidates for the current prediction block;
      selecting a motion vector from the ordered list of motion-vector candidates for use in encoding the current prediction block;
      encoding the current prediction block using the selected motion vector to generate a portion of the video data payload of the encoded bit-stream for the current prediction block; and
      providing a motion-vector-selection flag in the header portion of the encoded current prediction block, wherein the motion-vector-selection flag indicates a location in the ordered list of motion-vector candidates corresponding to the selected motion vector; and
   providing a coding-mode-selection flag in a header portion of the encoded bit-stream, wherein the coding-mode-selection flag indicates which of the plurality of coding modes was selected for encoding the coding block.

2. The method of claim 1, further comprising:
   dividing the unencoded video frame into the plurality of prediction blocks arranged in a plurality of rows and a plurality of columns, wherein the current prediction block is in a first row of the plurality of rows and a first column in the plurality of columns; and
   wherein obtaining the ordered list of motion-vector candidates includes:
      selecting a first motion vector previously used in encoding a first reference prediction block of the plurality of prediction blocks;
      selecting a second motion vector previously used in encoding a second reference prediction block of the plurality of prediction blocks; and
      electing a third motion vector previously used in encoding a third reference prediction block of the plurality of prediction blocks.

3. The method of claim 2, further comprising:
   selecting the first reference prediction block from the plurality of prediction blocks from a location in a second row of the plurality of rows and in the first column, the second row being adjacent to the first row;
   selecting the second reference prediction block from the plurality of prediction blocks from a location in the second row and in a second column of the plurality of columns, the second column being adjacent to the first column; and selecting the third reference prediction block from the plurality of prediction blocks from a location in the first row and in a third column of the plurality of columns, the third column being adjacent to the first column.

4. The method of claim 1, further comprising:
dividing the unencoded video frame into the plurality of prediction blocks arranged in a plurality of rows and a plurality of columns, wherein the current prediction block is in a first row of the plurality of rows and a first column in the plurality of columns;
wherein obtaining the ordered list of motion-vector candidates includes:
selecting a first motion vector previously used in encoding a first reference prediction block of the plurality of prediction blocks;
selecting a second motion vector previously used in encoding a second reference prediction block of the plurality of prediction blocks; and
selecting a zero-value motion vector.

5. The method of claim 4, further comprising:
selecting the first reference prediction block from the plurality of prediction blocks from a location in a second row of the plurality of rows and in the first column, the second row being adjacent to the first row; and
selecting the second reference prediction block from the plurality of prediction blocks from a location in the second row and in a second column of the plurality of columns, the second column being adjacent to the first column.

6. The method of claim 4, wherein:
selecting the first reference prediction block from the plurality of prediction blocks from a location in a second row of the plurality of rows and in the first column, the second row being adjacent to the first row; and
selecting the second reference prediction block from the plurality of prediction blocks from a location in the first row and in a second column of the plurality of columns, the second column being adjacent to the first column.

7. The method of claim 4, wherein:
selecting the first reference prediction block from the plurality of prediction blocks from a location in a second row of the plurality of rows, the second row being adjacent to the first row and in a second column of the plurality of columns, the second column being adjacent to the first column; and
selecting the second reference prediction block from the plurality of prediction blocks from a location in the first row and in a third column of the plurality of columns, the third column being adjacent to the first column.

8. The method of claim 1, wherein the unencoded video frame is divided into the plurality of prediction blocks arranged in a plurality of rows and a plurality of columns with the current prediction block being in a first row of the plurality of rows and a first column in the plurality of columns, and wherein the ordered list of motion-vector candidates includes, in order:
a first motion vector previously used in encoding a first reference prediction block of the plurality of prediction blocks;
a first zero-value motion vector; and
a second zero-value motion vector.

9. The method of claim 8, wherein the first reference prediction block is located in a second row of the plurality of rows and in the first column, the second row being adjacent to the first row.

10. The method of claim 8, wherein the first reference prediction block is located in a second row of the plurality of rows, the second row being adjacent to the first row, and in a second column of the plurality of columns, the second column being adjacent to the first column.

11. The method of claim 8, wherein the first reference prediction block is located in the first row and in a second column of the plurality of columns, the second column being adjacent to the first column.

12. The method of claim 1, wherein the ordered list of motion-vector candidates includes, in order:
a first zero-value motion vector;
a second zero-value motion vector; and
a third-zero-value motion vector.

13. The method of claim 1, wherein encoding the current prediction block using the selected motion vector includes:
using the selected motion vector to identify a second prediction block of a previously encoded frame of the sequence of video frames;
obtaining a residual between the current prediction block and the second prediction block; and
encoding the residual to generate the portion of the video data payload of the encoded bit-stream for the current prediction block.

14. The method of claim 1, wherein encoding the current prediction block using the selected motion vector includes:
using the selected motion vector to identify a second prediction block of a previously encoded frame of the sequence of video frames; and
encoding the second prediction block to generate the portion of the video data payload of the encoded bit-stream for the current prediction block.

15. A computing device, comprising:
a memory configured to store computer instructions; and
a processor configured to execute the computer instructions to:
obtain a coding block from an unencoded video frame of a sequence of video frames;
select a coding mode from a plurality of coding modes for use in encoding the coding block, the plurality of coding modes include an inter-coding mode, a skip-coding mode, and a direct-coding mode;
in response to selection of the inter-coding mode:
divide the obtained coding block into a plurality of prediction blocks; and
for each respective prediction block of the plurality of prediction blocks:
select a motion-vector-prediction method from a plurality of motion-vector-prediction methods for use in encoding the respective prediction block;
encode the respective prediction block based on the selected motion-vector-prediction method to generate a video data payload portion of an encoded bit-stream representative of the unencoded video frame for the respective prediction block; and
provide a selected-motion-vector-prediction-method flag in a header portion of the respective encoded prediction block, wherein the selected-motion-vector-prediction-method flag indicates which of the plurality of motion-vector-prediction methods was selected for encoding the respective prediction block;

in response to selection of the skip-coding mode or the direct-coding mode:
set the obtained coding block as a current prediction block;
obtain an ordered list of motion-vector candidates for the current prediction block;
select a motion vector from the ordered list of motion-vector candidates for use in encoding the current prediction block;
encode the current prediction block using the selected motion vector to generate a portion of the video data payload of the encoded bit-stream for the current prediction block; and
provide a motion-vector-selection flag in the header portion of the encoded current prediction block, wherein the motion-vector-selection flag indicates a location in the ordered list of motion-vector candidates corresponding to the selected motion vector; and
provide a coding-mode-selection flag in a header portion of the encoded bit-stream, wherein the coding-mode-selection flag indicates which of the plurality of coding modes was selected for encoding the coding block.

16. The computing device of claim 15, wherein the processor is configured to further execute the computer instructions to:
divide the unencoded video frame into the plurality of prediction blocks arranged in a plurality of rows and a plurality of columns, wherein the current prediction block is in a first row of the plurality of rows and a first column in the plurality of columns; and
obtain the ordered list of motion-vector candidates including:
select a first motion vector previously used in encoding a first reference prediction block of the plurality of prediction blocks;
select a second motion vector previously used in encoding a second reference prediction block of the plurality of prediction blocks; and
select a third motion vector previously used in encoding a third reference prediction block of the plurality of prediction blocks.

17. The computing device of claim 15, wherein the processor is configured to further execute the computer instructions to:
divide the unencoded video frame into the plurality of prediction blocks arranged in a plurality of rows and a plurality of columns, wherein the current prediction block is in a first row of the plurality of rows and a first column in the plurality of columns;
obtain the ordered list of motion-vector candidates including:
select a first motion vector previously used in encoding a first reference prediction block of the plurality of prediction blocks ;
select a second motion vector previously used in encoding a second reference prediction block of the plurality of prediction blocks ; and
select a zero-value motion vector.

18. The computing device of claim 15, wherein the unencoded video frame is divided into the plurality of prediction blocks arranged in a plurality of rows and a plurality of columns with the current prediction block being in a first row of the plurality of rows and a first column in the plurality of columns, and wherein the ordered list of motion-vector candidates includes, in order:
a first motion vector previously used in encoding a first reference prediction block of the plurality of prediction blocks;
a first zero-value motion vector; and
a second zero-value motion vector.

19. The computing device of claim 15, wherein the processor is configured to further execute the computer instructions to encode the current prediction block using the selected motion vector including:
use the selected motion vector to identify a second prediction block of a previously encoded frame of the sequence of video frames;
obtain a residual between the current prediction block and the second prediction block; and
encode the residual to generate the portion of the video data payload of the encoded bit-stream for the current prediction block.

20. The computing device of claim 15, wherein the processor is configured to further execute the computer instruction encode the current prediction block using the selected motion vector including:
use the selected motion vector to identify a second prediction block of a previously encoded frame of the sequence of video frames; and
encode the second prediction block to generate the portion of the video data payload of the encoded bit-stream for the current prediction block.

21. A non-transitory computer readable medium having stored contents that, when executed by a processor of a computing system, cause the computing system to perform actions, the actions comprising:
obtaining a coding block from the unencoded video frame;
selecting a coding mode from a plurality of coding modes for use in encoding the coding block, the plurality of coding modes include an inter-coding mode, a skip-coding mode, and a direct-coding mode;
in response to selection of the inter-coding mode:
dividing the obtained coding block into a plurality of prediction blocks; and
for each respective prediction block of the plurality of prediction blocks:
selecting a motion-vector-prediction method from a plurality of motion-vector-prediction methods for use in encoding the respective prediction block;
encoding the respective prediction block based on the selected motion-vector-prediction method to generate a video data payload portion of the encoded bit-stream for the respective prediction block; and
providing a selected-motion-vector-prediction-method flag in a header portion of the respective encoded prediction block, wherein the selected-motion-vector-prediction-method flag indicates which of the plurality of motion-vector-prediction methods was selected for encoding the respective prediction block;
in response to selection of the skip-coding mode or the direct-coding mode:
setting the obtained coding block as a current prediction block;
obtaining an ordered list of motion-vector candidates for the current prediction block;
selecting a motion vector from the ordered list of motion-vector candidates for use in encoding the current prediction block;

encoding the current prediction block using the selected motion vector to generate a portion of the video data payload of the encoded bit-stream for the current prediction block; and providing a motion-vector-selection flag in the header portion of the encoded current prediction block, wherein the motion-vector-selection flag indicates a location in the ordered list of motion-vector candidates corresponding to the selected motion vector; and providing a coding-mode-selection flag in a header portion of the encoded bit-stream, wherein the coding-mode-selection flag indicates which of the plurality of coding modes was selected for encoding the coding block.

* * * * *